United States Patent

Baloche et al.

[11] Patent Number: 6,082,821
[45] Date of Patent: Jul. 4, 2000

[54] VEHICLE SEAT MOBILE JOINT MECHANISM, AND VEHICLE SEAT EQUIPPED WITH SUCH A MECHANISM

[75] Inventors: François Baloche, La Carneille; Denis Ganot, Caen, both of France

[73] Assignee: Bertrand Faure Equipements SA, Boulogne, France

[21] Appl. No.: 09/298,650

[22] Filed: Apr. 23, 1999

[30] Foreign Application Priority Data

Apr. 27, 1998 [FR] France ................................. 98 05235

[51] Int. Cl.⁷ ................................................. B60N 2/02
[52] U.S. Cl. ................ 297/354.12; 297/367; 297/378.12
[58] Field of Search .............................. 297/367, 378.12, 297/363, 364, 365, 354.12

[56] References Cited

U.S. PATENT DOCUMENTS

| | | | |
|---|---|---|---|
| 5,590,931 | 1/1997 | Fourrey et al. | 297/367 X |
| 5,611,599 | 3/1997 | Baloche et al. | 297/367 |
| 5,622,407 | 4/1997 | Yamada et al. | 297/367 X |
| 5,755,491 | 5/1998 | Baloche et al. | 297/367 X |
| 5,769,494 | 6/1998 | Barrere et al. | 297/367 |
| 5,779,313 | 7/1998 | Rohee | 297/378.12 X |
| 5,857,746 | 1/1999 | Barrere et al. | 297/367 |

*Primary Examiner*—Peter M. Cuomo
*Assistant Examiner*—Stephen Vu
*Attorney, Agent, or Firm*—Marshall, O'Toole, Gerstein, Murray & Borun

[57] ABSTRACT

A mobile joint mechanism comprising a fixed flange and a mobile flange that can be locked by two units controlled by a sliding push-rod that is itself activated by the pivoting of two control plates linked one to the other by idle movement, to free the mobile flange. A circular guide includes radial gaps that receive the units, and maintain the units in retracted position when they disengage from the radial gaps through the pivoting of one of the control plates, which also fixes the circular guide to the mobile flange. The mobile flange can thus turn freely before in re-locks at its original angle when the radial gaps of the circular guide return to be opposite the units.

12 Claims, 10 Drawing Sheets

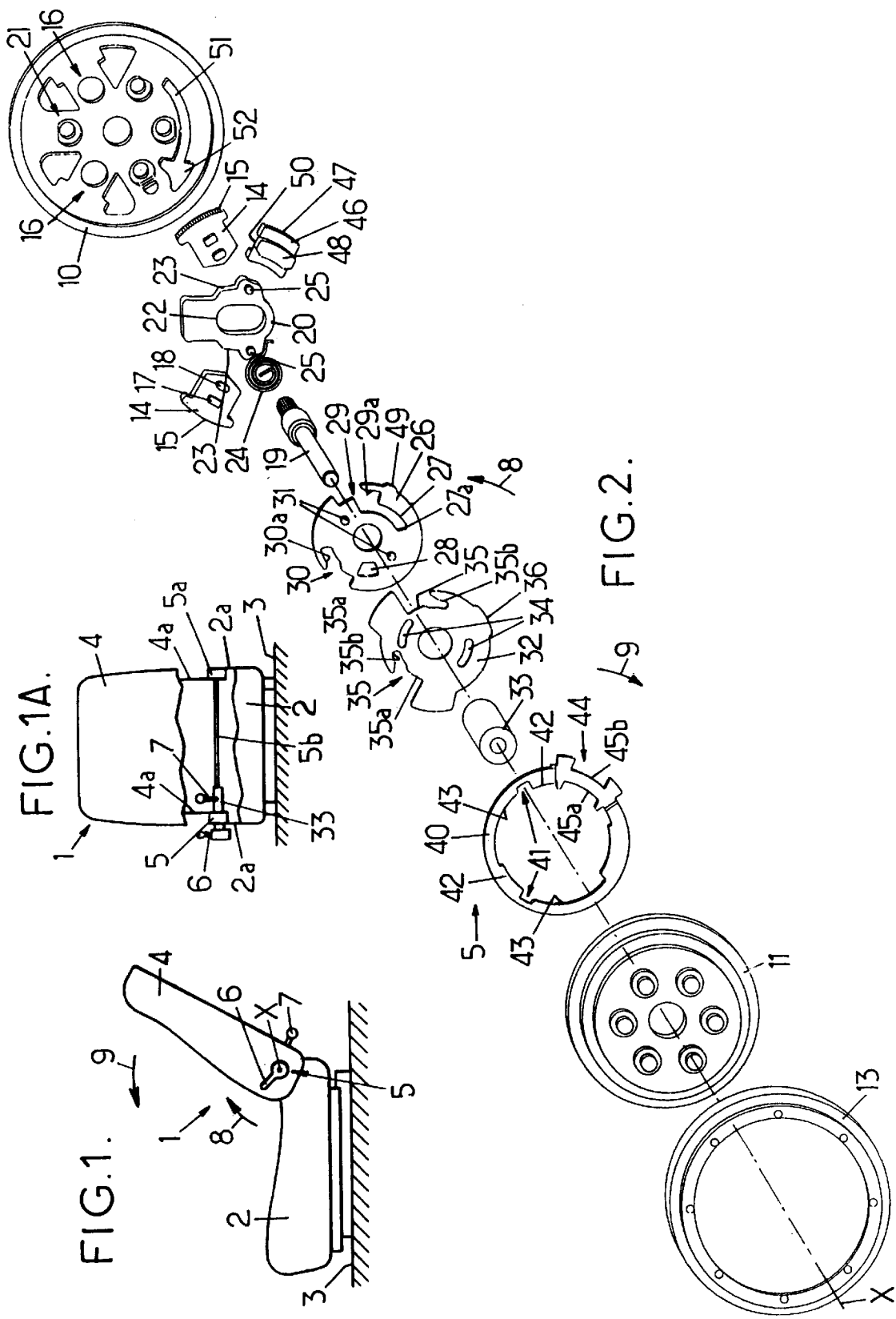

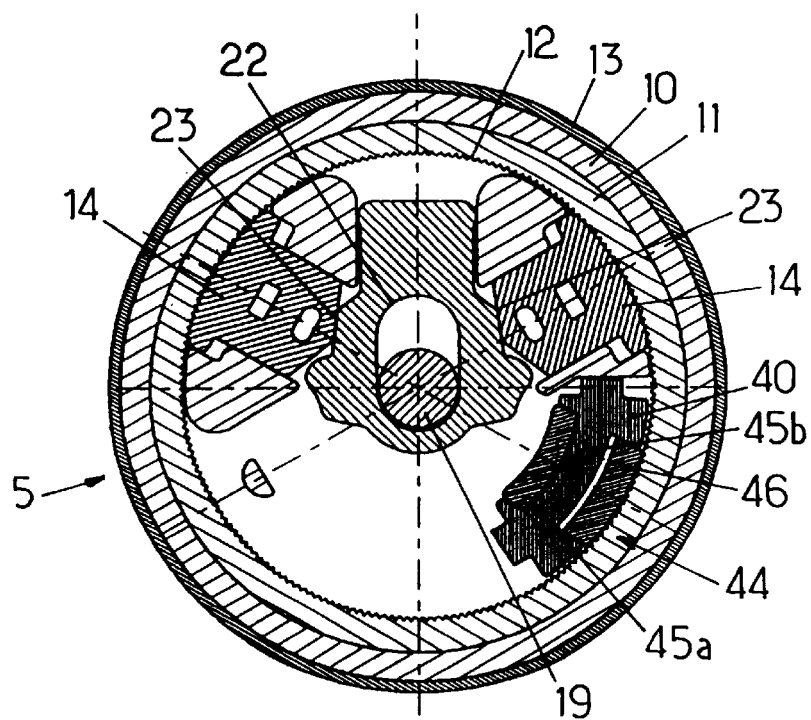
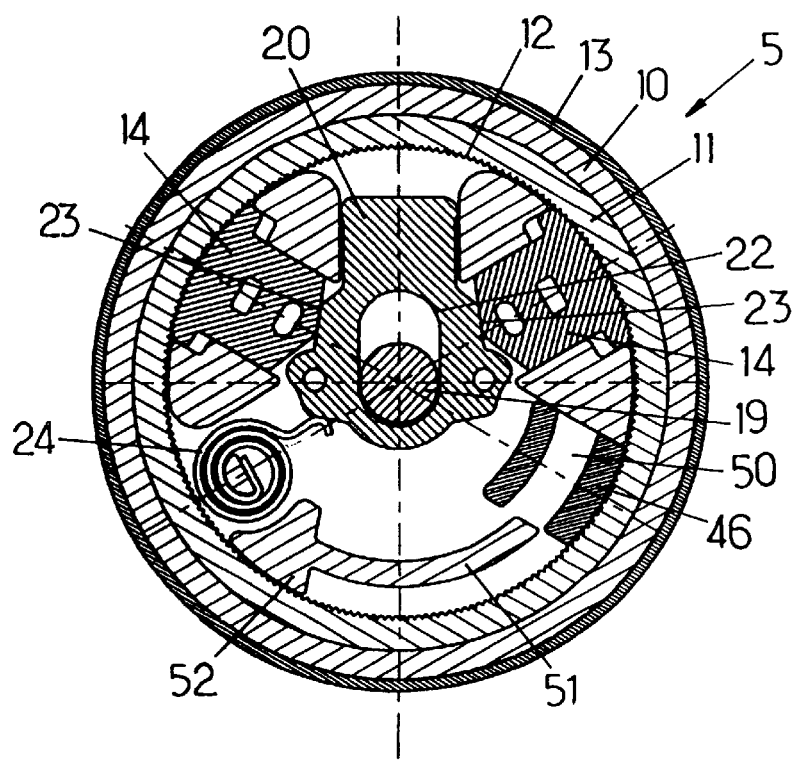

VEHICLE SEAT MOBILE JOINT MECHANISM, AND VEHICLE SEAT EQUIPPED WITH SUCH A MECHANISM

FIELD OF THE INVENTION

This invention relates to vehicle seat mobile joint mechanisms for seat backs, and to vehicle seats equipped with such mechanisms.

More particularly, the invention concerns a mobile joint mechanism intended to equip a vehicle seat that includes on the one hand a seat, and on the other hand a back that pivots in relation to the seat, this mechanism including:

- a first and a second flange designed to be fixed, the first to the seat, and the other to the back, these flanges being mounted so as to pivot in relation to each other around a rotation axis, the second flange being permanently fixed to a toothed gear that extends at least over the arc of a circle centred on the rotation axis,
- at least one locking unit equipped with a toothed gear designed to engage with the toothed gear of the second flange, this locking unit being movable in a radial plane in relation to the first flange, between on the one hand an engaged position in which the toothed gear of the locking unit engages with the toothed gear of the second flange to unlock the mechanism, and on the other hand a retracted position in which the toothed gear of the locking mechanism does not engage with the toothed gear of the second flange, this locking unit moreover including a first pin protruding axially towards the second flange,
- a locking device that controls the sliding of the locking mechanism, this locking device being activated elastically towards a neutral position in which the said locking device puts the locking unit into its engaged position, and the said locking device being movable to an active position in which it allows the locking unit to slide to its retracted position,
- a first controlling device mounted to pivot around the rotation axis between a neutral position and an operative position, this first controlling device being adapted to move the locking mechanism from its neutral position to an activating position in which the said locking device allows the locking unit to slide towards its retracted position when the said first controlling device is moved at an angle from its neutral position to its operative position, and the first operating gear being activated elastically towards its neutral position,
- methods for moving the locking unit towards its retracted position when the locking device is in an activating position,
- and a circular guide that is linked mechanically to the second flange and that engages with the first pin in order to maintain the locking mechanism positively in its retracted position when this locking mechanism is in a predetermined range in relation to the said circular guide, this circular guide having at least one gap in which the first pin can engage when the locking mechanism is not in the said predetermined range of angled positions, allowing the locking unit to move to its engaged position.

BACKGROUND OF THE INVENTION

Document EP-A-0 770 514 describes an example of such a mobile joint mechanism which can remain unlocked even after the control device has been released when the back of the seat is tipped forward, for example in order to gain access to the back seats of a vehicle if the mechanism concerned has been fitted on the front seats of a two-door vehicle. When the seat back is then raised again the mechanism re-locks itself automatically as soon as the first pin comes opposite the corresponding gap in the circular guide.

The mechanism described in this document is entirely satisfactory, but nevertheless has the disadvantage that it always re-locks the seat back at the same angle when the back is raised after having been tilted forward, regardless of the previous adjustment of the said back.

The user of this seat must therefore readjust the back each time he raises it after having tilted it forward.

Moreover, document EP-A-0 694 434 describes a mobile joint mechanism using toothed locking units which allows the seat back to be tilted forward and then automatically re-locks the back in its previously adjusted position. This mechanism works perfectly, but the mechanism's toothed locking units, which allow adjustment of the back, interlock with a toothed gear that is itself mobile in relation to the second flange and which can be fixed to this second flange via other toothed locking units.

In this case both flanges are thus connected by two levels of toothed locking units, which tends to make the mechanism heavier and more complex.

SUMMARY AND OBJECTS OF THE INVENTION

The aim of the present invention is thus to propose a mobile joint mechanism of the type described in document EP-A-0 770 514, but able to re-lock automatically in the last position at which the back was adjusted when the back is raised after having been tilted forward, while retaining only a single level of toothed gears.

To this end, according to the invention, a device of the type concerned is essentially characterised in that:

- the circular guide is formed by a rim belonging to a a controller, said to be memory retaining, that is mounted to pivot in relation to the first and second flanges around the rotation axis,
- this memory controller includes a first radial guide which engages with the gap in the circular guide, allowing the first pin to slide radially in this guide, with practically no play in the direction of the circumference.
- the memory retaining controller moreover includes a second radial guide and a memory retaining unit fitted with a toothed gear designed to engage with the toothed gear of the second flange, the memory retaining unit being mounted to slide in the second radial guide between, on the one hand an engaged position in which this memory retaining unit engages with the toothed gear of the second flange to immobilise the memory retaining controller in relation to this second flange, and on the other hand a retracted position in which the memory retaining unit does not engage with the toothed gear of the second flange and allows relative rotation between the memory retaining controller and the second flange,
- a second controlling device is mounted to pivot around the rotation axis between a neutral position and an active position, this second controlling device being activated by elastically towards its neutral position and being mobile in the said angle from its neutral position to its active position, the said second controlling device engaging with the locking mechanism to:

prevent controlling device of this locking mechanism from moving from its engaged position up to a point at which the first pin could disengage from the first radial guide of the memory retaining controller as long as the second controlling device is in its neutral position, and to allow the said locking unit to move from its engaged position up to a point at which the first pin can disengage from the first radial guide of the memory controller when the said second controlling device is in its operative position, the second controlling device is linked to the first controlling device by an idle movement mechanical link that is adapted:

to allow the first controlling device to move to its operative position while leaving the second controlling device in its neutral position when the said first controlling device is activated by a user in the activating direction, and to drive the first controlling device with the second controlling device when the said second controlling device is activated by a user in the operating direction, the second controlling device engages with the memory retaining unit to maintain this unit in its engaged position when the said second controlling device is moved to its operative position without any relative rotation between the first and second flanges, and to allow the memory retaining unit to move to its retracted position when the said second controlling device is in its neutral position, and, when the second controlling device is placed in its operative position and the second flange has been rotated in relation to the first flange at a predetermined angle, called tilting direction, the memory retaining unit engages with an arc shaped guide that is centred on the rotation axis and that is fixed to the first flange, to then maintain the memory retaining unit in its engaged position, in such a way that the memory controller follows the second flange, the memory retaining unit not engaging with the arc shaped guide when the first pin of the locking unit comes into correspondence with the first radial guide.

Thanks to these arrangements, when the seat user wishes to adjust the angle of the back, he acts on the first controlling device at the activating angle, which unlocks the locking unit which remains fixed to the memory controller. The memory controller then remains fixed to the first flange.

On the other hand, when the user wishes to tilt the back as far forward as it will go, the user acts on the second controlling device at the activating angle mentioned above, which not only unlocks the locking unit, but also allows the first pin of that unit to disengage from its radial guide. At the same time, the memory-retaining unit remains engaged with the toothed gear of the second flange, fixing the memory controller to this second flange in the position corresponding to the last position at which the seat back was adjusted.

When the back is then tilted forward, the circular guide belonging to the memory controller slides against the first pin of the locking unit, maintaining the said locking unit in its retracted position, even after the controlling device has been released.

Afterwards, when the seat back is tilted back, the circular guide of the memory retaining plate again slides against the first pin until the first radial guide comes level with the first pin of the locking unit, which allows the locking unit to re-engage with the toothed gear of the second flange: the back is thus re-locked in the position in which the user had originally adjusted it.

Moreover it is possible to couple the first controlling device with a transverse linking rod that controls a locking mechanism built on the side of the seat opposite the above mentioned locking mechanism.

As the first controlling device moves in the activating direction until it reaches its operative position, both when it is itself activated by a user and when the second controlling device is being activated, the locking mechanism concerned may be a standard mechanism which can be placed:

either in a neutral position in which it locks the seat back in relation to the seat when the first controlling device is in its operative position, or in an unlocked position in which it releases the back in relation to the seat when the first controlling device is moved to its operative position.

In preferred modes of producing the invention one and/or the other of the following arrangements may be used:

the second controlling device includes a memory controlling plate that is perpendicular to the rotation axis and that engages:

on the one hand with the memory retaining unit in order to maintain this memory retaining unit in its locked position when the second controlling device is in its operative position, and on the other hand with a second pin that belongs to the locking unit and that protrudes axially towards the second flange, to prevent the locking unit from leaving its locked position until the point at which the first pin might disengage from the first radial guide of the memory controller when the second controlling device is in its neutral position, and to move the locking unit to a point allowing the first pin of this locking unit to disengage from the first radial guide of the memory controller when the second controlling device is activated;

the first controlling device includes an adjustment control plate perpendicular to the rotation axis, this adjustment control plate engaging with the second pin of the locking unit to move the locking unit to its retracted position when the first controlling device is moved to its operative position, and to allow the locking unit to leave its locked position to the point at which the first pin can disengage from the first radial guide of the said memory controller when the first controlling device is in its operative position;

the adjustment control plate is linked to the memory retaining control plate by means of the said idle movement mechanical link;

the locking device is mounted to slide in relation to the first flange and is linked mechanically with the adjustment control plate, so that the locking device pushes the memory retaining plate and the adjustment control plate back into their neutral positions when the said locking device is itself in its neutral position, and so that the adjustment control plate pushes the locking device back to its activating position when the said adjustment control plate is in its operative position;

the mechanism includes two identical locking units that are placed symmetrically in relation to the locking device;

the locking device engages with the two locking units by wedge effect to push them back to their engaged positions;

the locking device includes at least one pin that protrudes axially towards the second flange and enters at least one notch cut into the adjustment control plate, the finger of the locking device engaging with the adjustment control plate to:

move the said locking device to its activating position when the first controlling device is moved to its operative position, and maintain the first controlling device in its neutral position when the locking device is maintained elastically in its neutral position;

one of the first and second controlling devices includes a central shaft on which the locking device slides, the said locking device moreover sliding in a guide fixed to the first flange;

the circular guide that engages with the first pin of the locking unit is equipped with a limit stop that projects radially at the level of the gap in this circular guide, on one side only of the said gap, so that when the first pin of the locking unit leaves the first radial guide, the second flange can pivot in the plane of the tilting angle in relation to the first flange, then in the opposite direction, until the first pin of the locking unit meets the said limit stop of the circular guide, after which the said first pin can reengage in the first radial guide.

Moreover, the invention also concerns a vehicle seat comprising, on the one hand a seat, and on the other hand a back that pivots on the seat by means of a mobile joint mechanism as described above, the first and second flanges of which are fixed, the one with the seat, and the other with the back.

Advantageously, the seat comprises two sides, the one equipped with the said mobile joint mechanism, and the other with a locking mechanism that is movable between, on the one hand a locking position in which the said locking mechanism prevents pivoting of the back in relation to the seat, and on the other hand an unlocked position in which the said locking mechanism prevents the back from pivoting in relation to the seat, the locking mechanism being controlled by a transverse linking rod that is linked to the first controlling device of the mobile joint mechanism, the neutral position of the first controlling device corresponding to the locking position of the locking mechanism and the active position of the first controlling device corresponding to the unlocked position of the said locking mechanism.

BRIEF DESCRIPTION OF THE DRAWINGS

Other characteristics and advantages of the invention will appear in the course of the following descriptions of two forms of its production, given as non restrictive examples, in relation to the attached figures.

In the figures:

FIGS. 1 and 1A are schematic views, of the front and rear, respectively, of a vehicle seat equipped with a mobile joint mechanism according to a form of production of the invention, FIG. 2 is an exploded view of the mobile joint mechanism that equips the seat in FIG. 1, FIGS. 4 to 7 are cross-sections, respectively along lines IV—IV, V—V, VI—VI and VII—VII of the mechanism in FIG. 3, also in locked position.

MORE DETAILED DESCRIPTION

Figure 5:
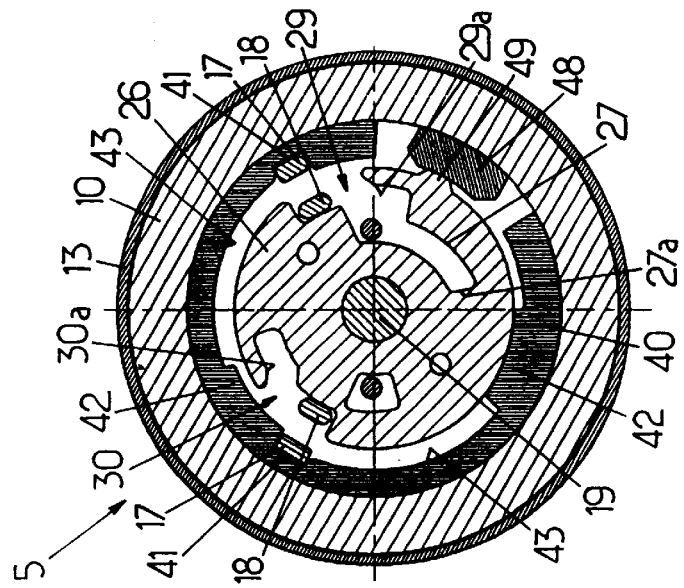

In the various figures the same references refer to identical or similar elements.

As is represented schematically on FIGS. 1 and 1A, the invention relates to a vehicle seat 1, more particularly a front seat of a car, comprising on the one hand a seat 2 mounted on the floor 3 of the vehicle, and on the other hand of a back 4 mounted to pivot on a seat 2 around a transverse horizontal axis X.

This pivoting assembly of the back 4 is achieved by means of at least one mobile joint 5 fitted on one side of the seat and controlled by two handles 6 and 7.

Usually a second mobile joint 5a, herein called blocking mechanism, is fitted on the opposite side of the seat and is linked to handle 6 of mobile joint 5 by means of a rigid transverse linking rod 5b.

Blocking mechanism 5a is a standard type mechanism, for example that described in document EP-A-0 502 774, and this locking mechanism is normally in a locking position in which it prevents seat back 4 from pivoting in relation to seat 2 when handle 6 is in its neutral position.

Pivoting of handle 6 in an angular direction 8 allows a user to adjust the inclination of seat back 4 by acting directly on the back, while pivoting of handle 7 in the same direction 8 allows seat back 4 to be tilted completely forward in direction 9, particularly to give access to the back seats of the vehicle when the vehicle only has two front doors.

Figure 3:
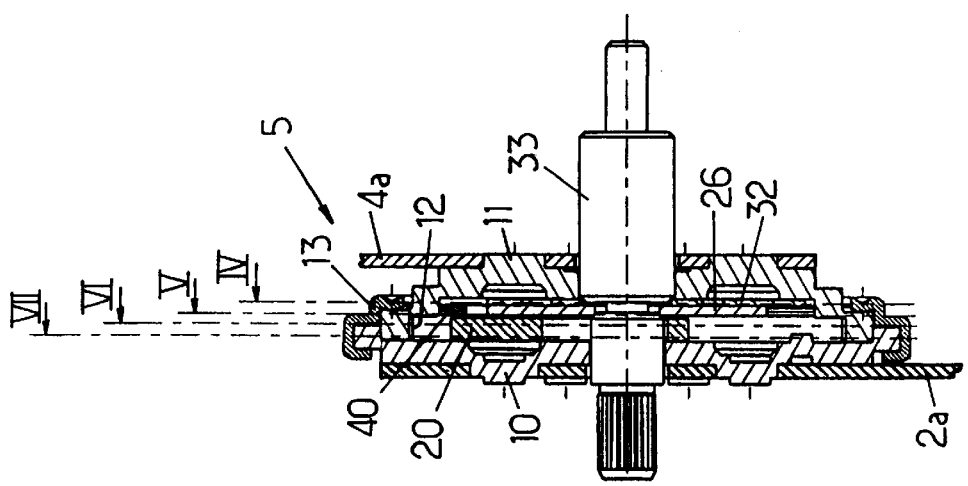
FIG. 3 is a section in the axial plane of the mechanism in FIG. 2, in locked position.
Figure 9:
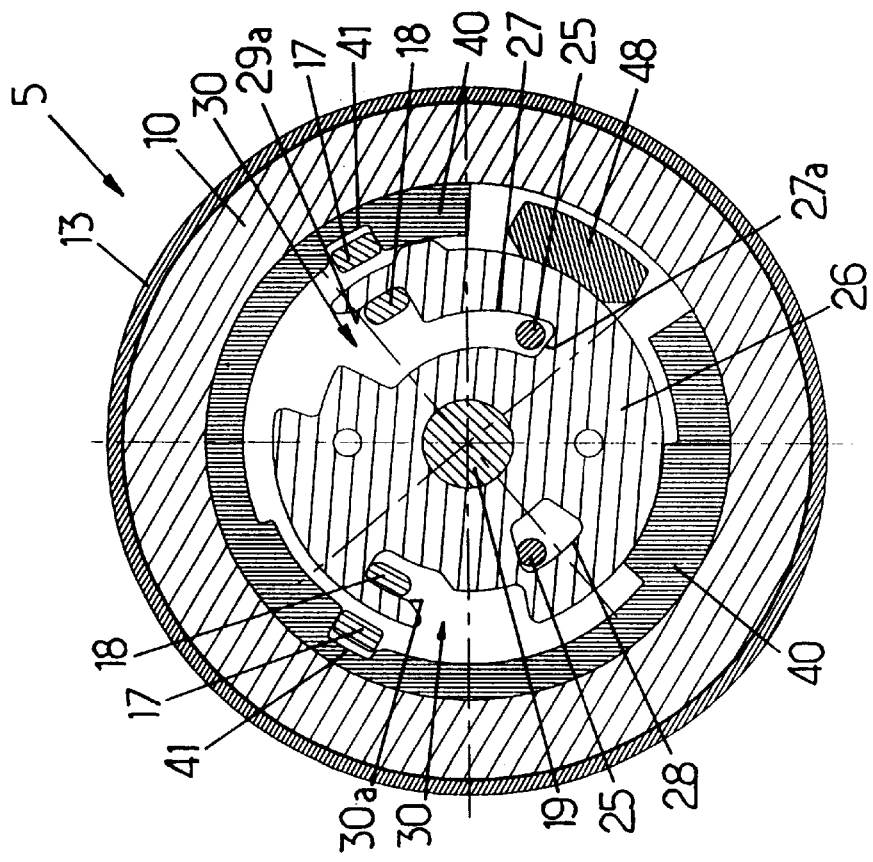
FIGS. 8 to 11 are similar views to FIGS. 4 to 7, showing the state of the device during adjustment of the angle of the seat back.
Figure 8:
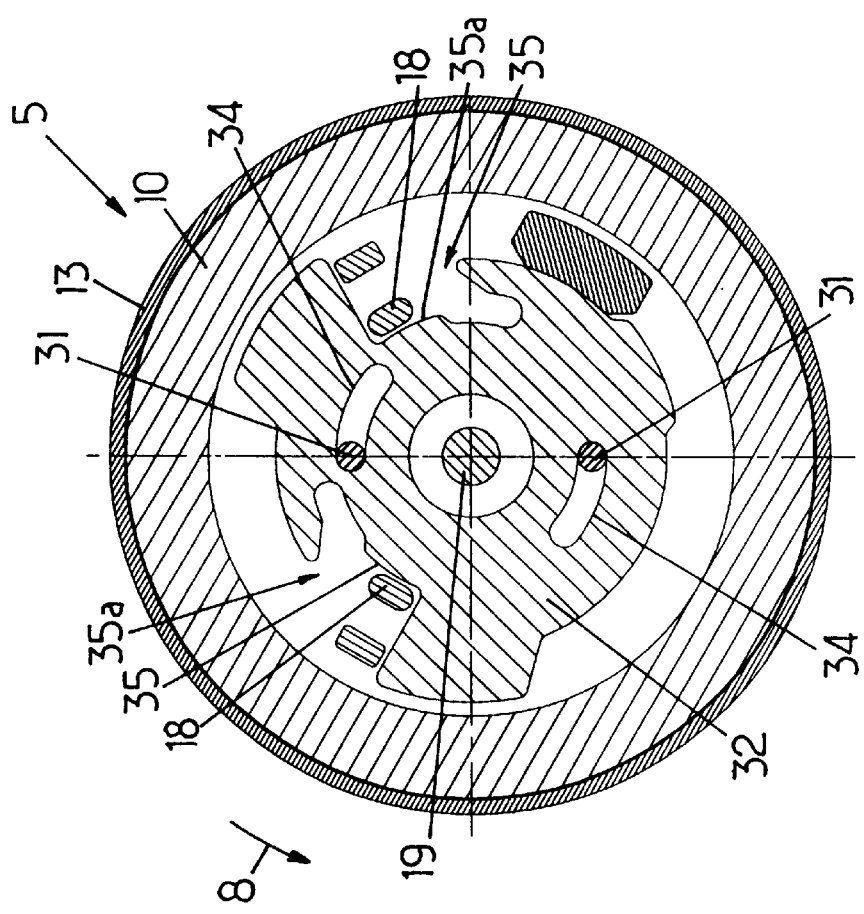
Figure 10:
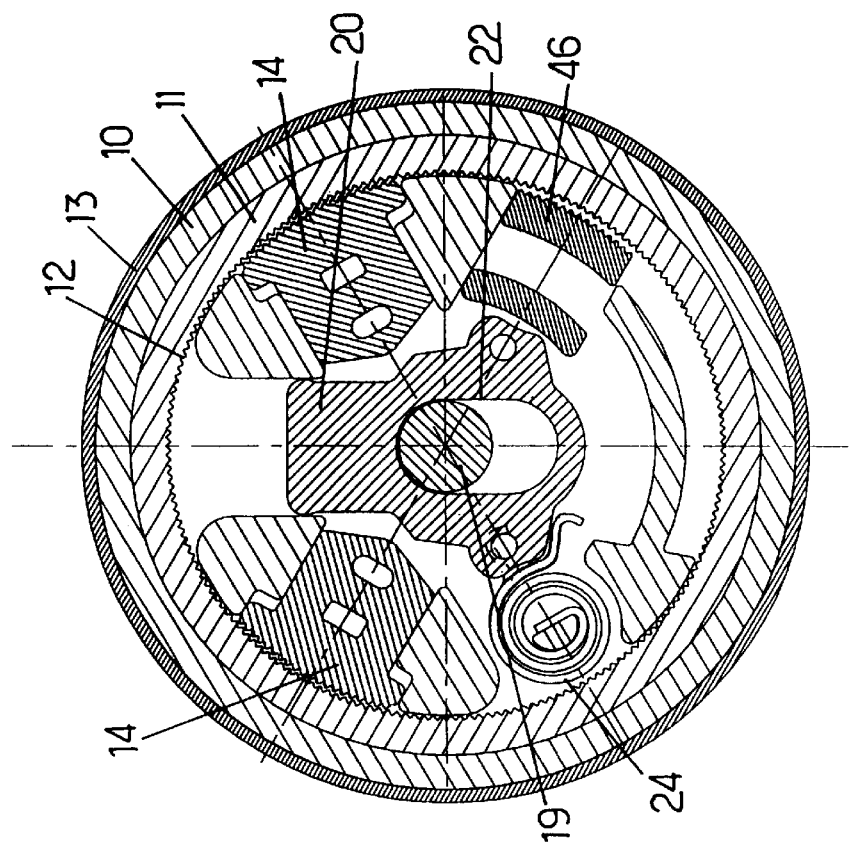
Figure 11:
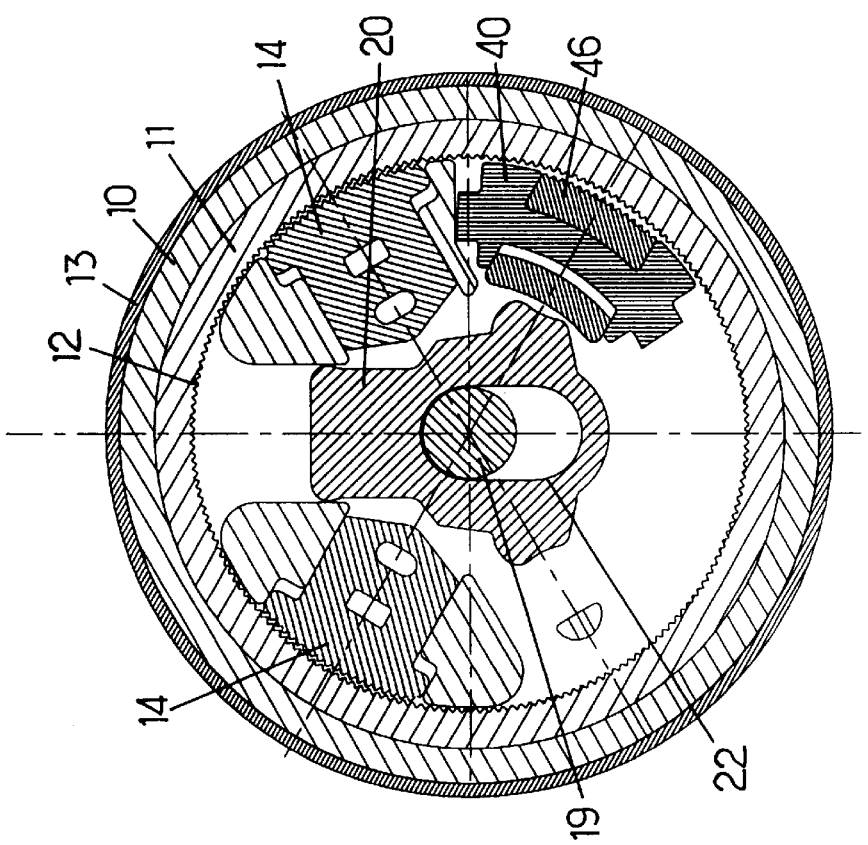
Figure 13:
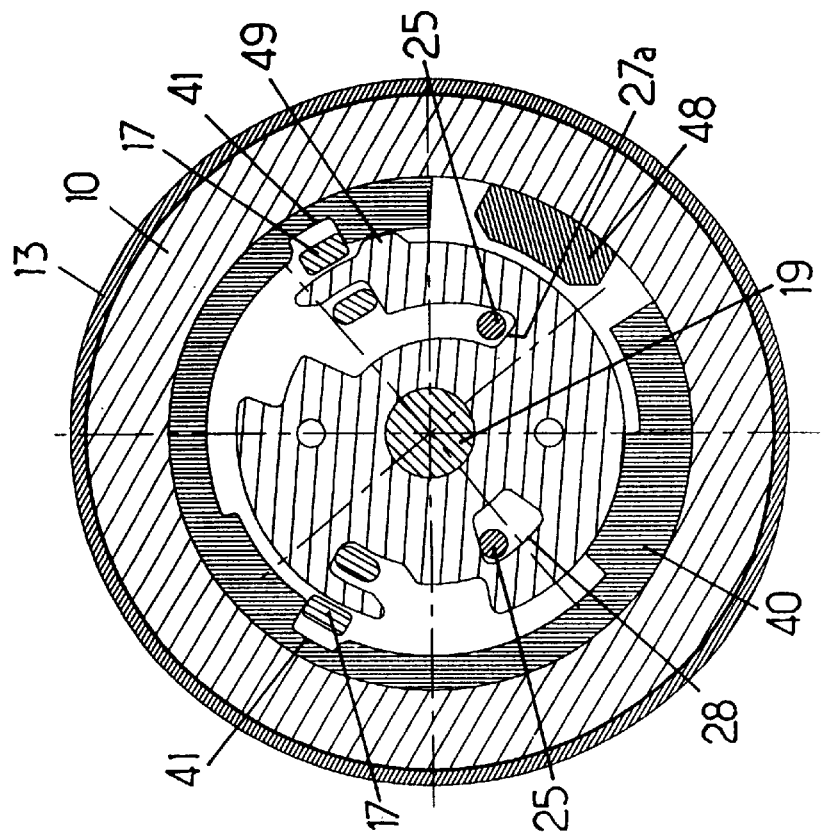
FIGS. 12 to 15 are similar views to FIGS. 4 to 7, when the mechanism is actuated during forward tilting of the seat back to its most forward position, but before this position is reached.
Figure 12:
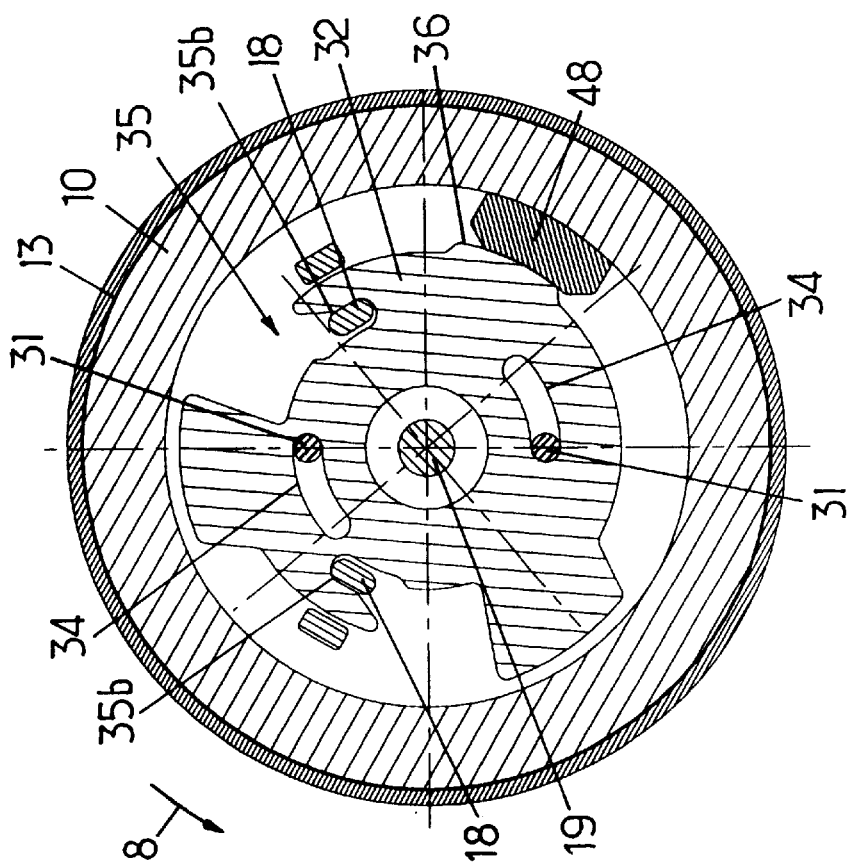
Figure 15:
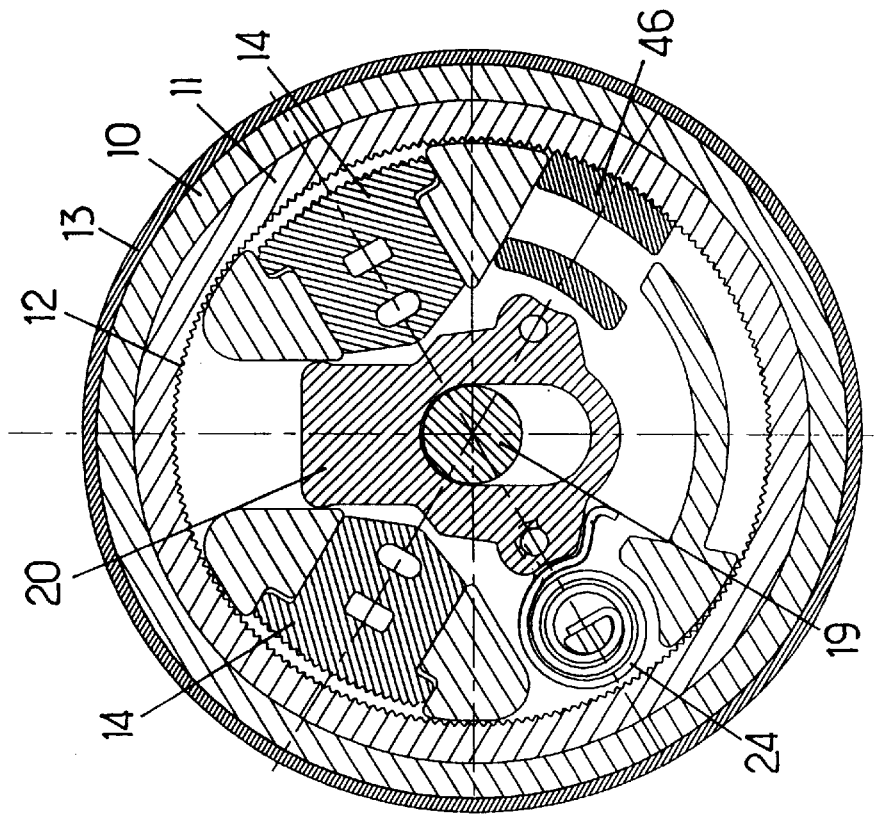
Figure 14:
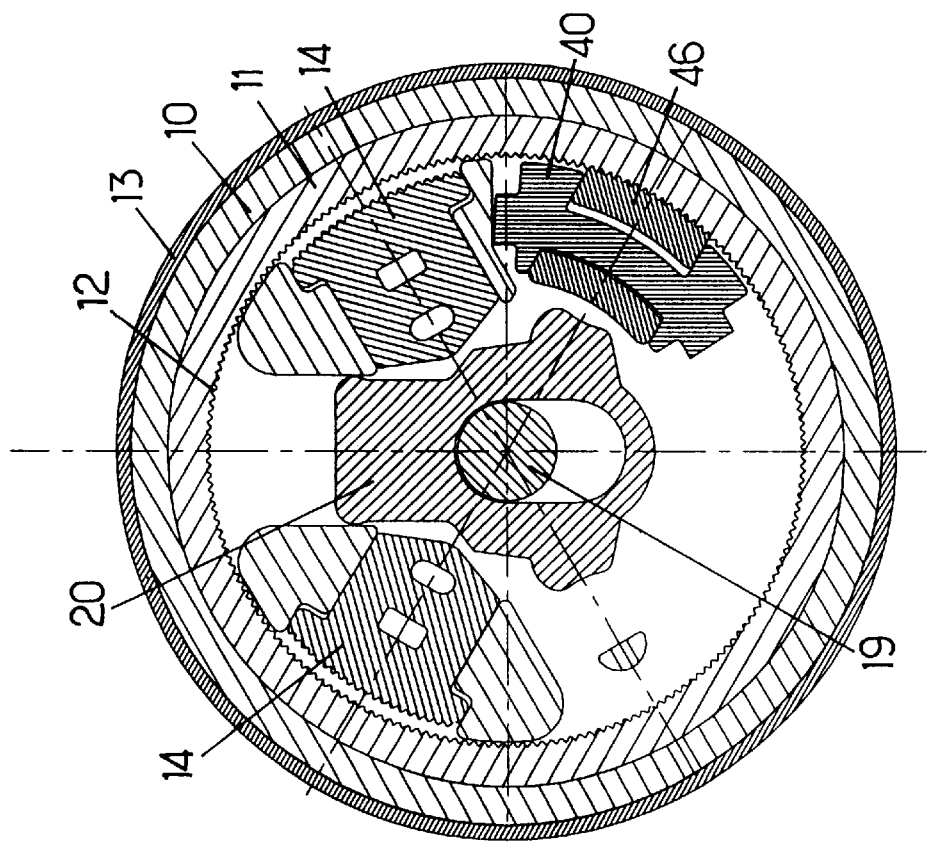
Figure 17:
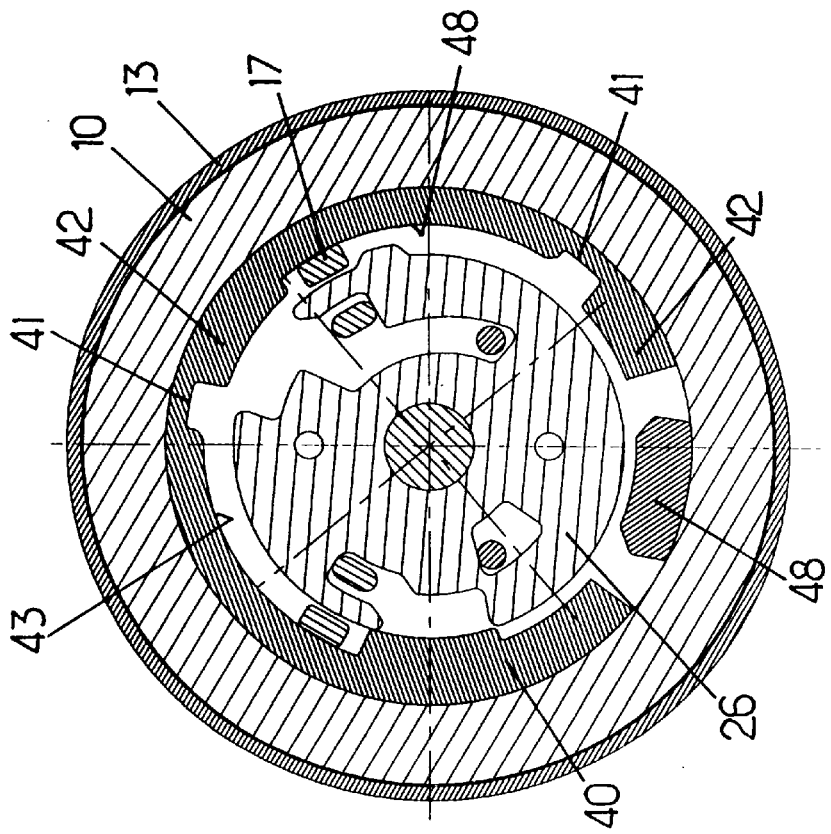
Figure 16:
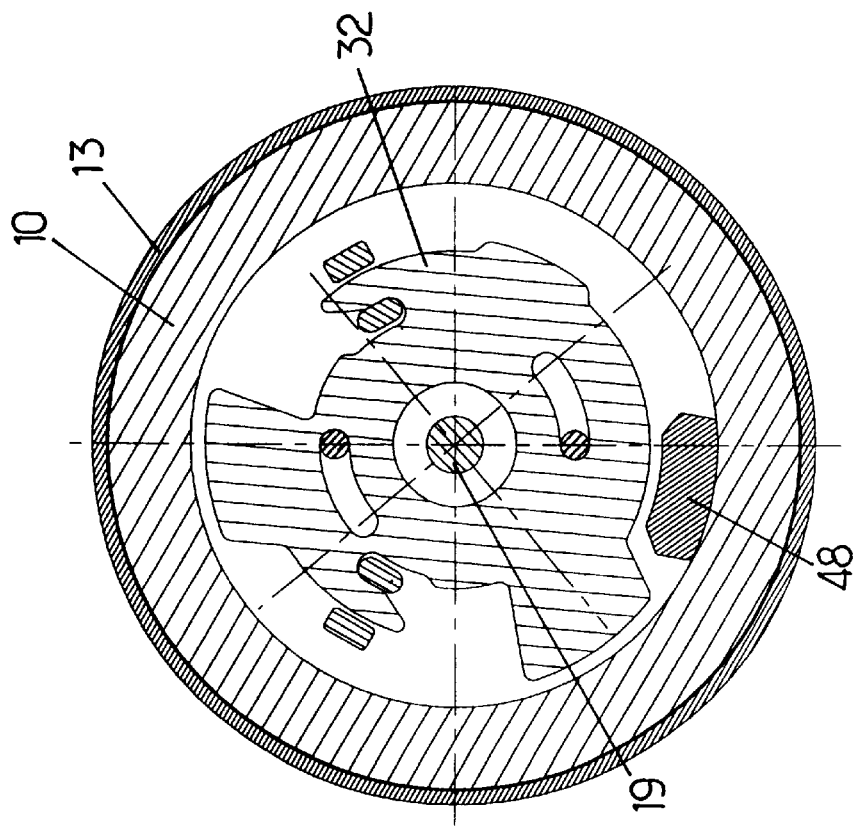
Figure 18:
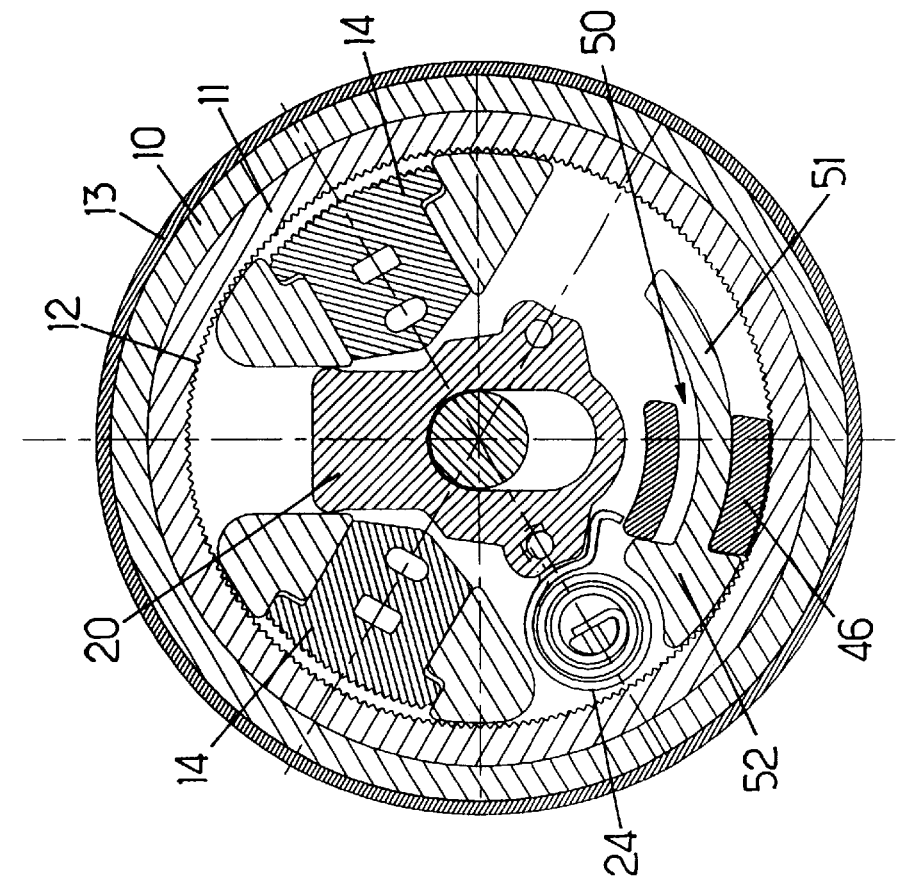
Figure 19:
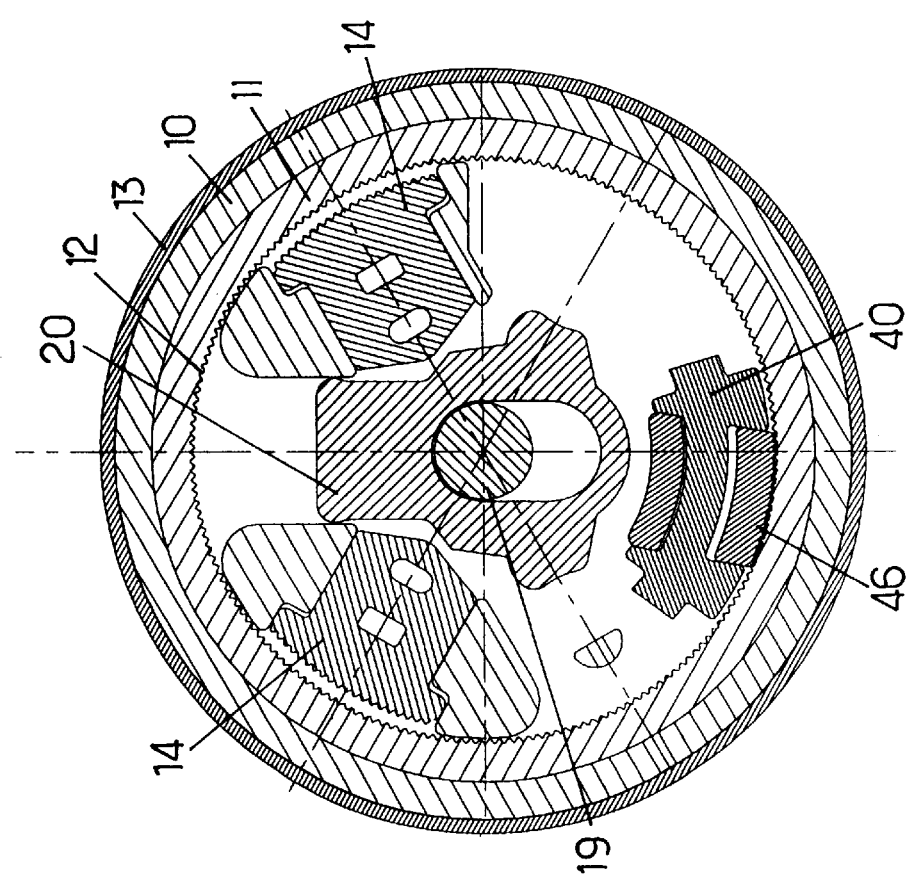
Figure 20:
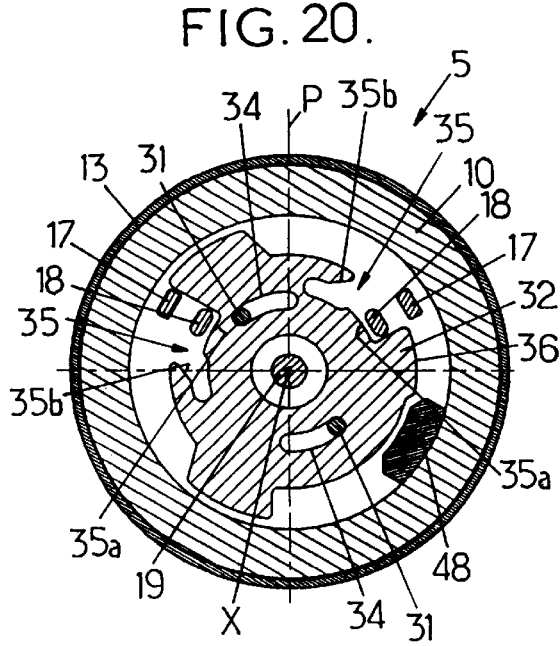
FIGS. 20 to 23 are similar views to FIGS. 4 to 7 for a variant of the mobile joint mechanism according to the invention.
Figure 21:
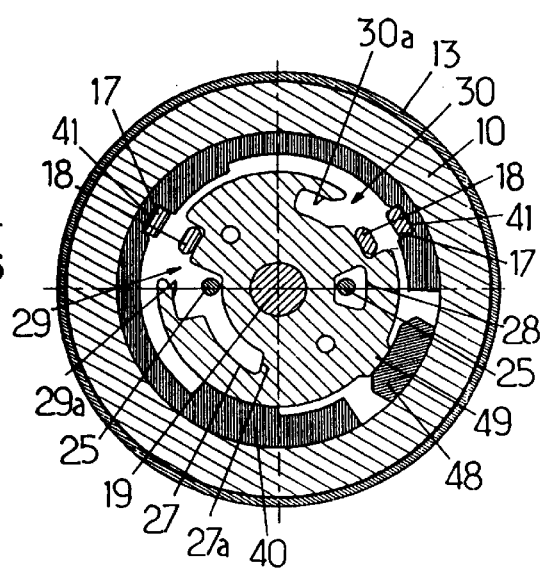
Figure 22:
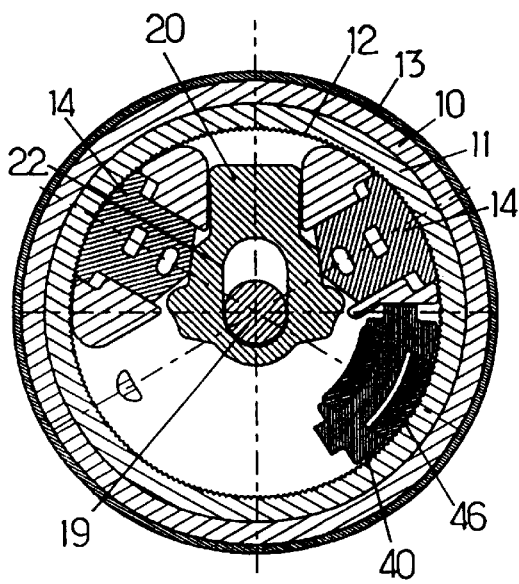
Figure 23:
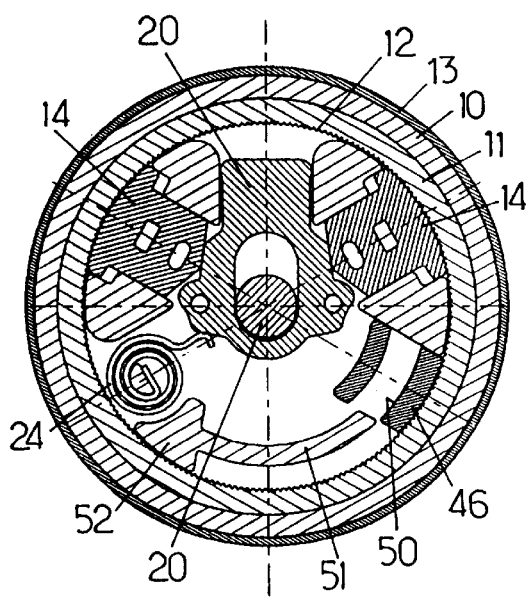

As is shown in FIGS. 2 and 3, the mobile joint mechanism includes:

a fixed metal flange 10 perpendicular to axis X, that is fixed to the rigid seat frame 2a, a mobile metal flange 11 also perpendicular to axis X, that is fixed to the rigid back frame 4a and is furnished with an internal circle of toothed gears 12 centred on axis X, a metal crown 13 that is crimped around the rims of the fixed and mobile flanges and forming with the latter a circular closed box, two metal locking units 14 (see also FIGS. 6 and 7) placed at an angle of about 120° to each other, each of which has an external toothed gear 15 adapted to lock with the toothed gear 12 of the mobile flange, each of these units being mounted to slide radially in a guide 16 fixed to the fixed flange, between, on the one hand an engaged position in which the toothed gear 15 engages with the toothed gear 12 of the mobile flange to lock mechanism 5, and on the other hand a retracted position in which unit 14 does not engage with the toothed gear 12 of the mobile flange, each of units 14 furthermore having first and second pins 17 and 18 that protrude axially towards mobile flange 11, the second pin 18 being placed radially inward of the first pin 17, a control shaft 19 that that is mounted to pivot around axis X and is fixed to handle 6, a locking device 20 which takes the form of a cut and stamped metal plate lying in the same plane as the locking units 14, this locking device being mounted to slide radially in a guide 21 fixed to flange 10 in a sliding direction corresponding to the median of the sliding directions of locking units 14, and the control gear being pierced by an oblong hole 22 that extends longitudinally in the sliding direction of the said locking device and is traversed by a circular part of control shaft 19, the locking device 20 moreover including:

two lateral support surfaces 23 that are shaped so as to push locking units 14 back to their engaged positions by wedge effect when the locking device 20 is pushed back radially and outwardly towards a neutral position by the action of a spring 24 mounted on fixed flange 10, and two pins or fingers 25 that protrude axially towards mobile flange 11 and lie on either side of oblong hole 22;

a first cut metal control plate 26 (see also FIG. 5) that extends in parallel plane to locking device 20 and is interposed between this locking device and mobile flange 11, the first control plate 26 being fixed in rotation with control shaft 19, the said first control plate 26 comprising:

an arc shaped cut 27 centred on rotation axis X and that receives one of pins 25 of the locking device, this cut having a terminal edge 27*a* that pushes against the corresponding pin 25 when handle 6 is turned, defining an operative position of control plate 26 and of handle 6, a cut 28 that receives the other pin 25 and whose edge acts on this pin to push locking device 20 radially and inwardly back to an operative position when handle 6 is turned in the angled direction 8, which then allows the locking units 14 to slide towards their retracted positions, the said pin 25 also acting on the edge of cut 28 in the locked position of mechanism 5, to then place control plate 26 in a neutral position under the action of spring 24, two notches 29 and 30 that each receive the second pin 18 of one of the locking units 14, each of notches 29 and 30 having a cam edge directed radially and inwardly, respectively 29*a* and 30*a*, that is adapted to act on the second pin 18 of the corresponding unit 14 in order to move this unit towards its neutral position when handle 6 is turned, and two pins 31 lying diametrically in relation to axis X and projecting axially towards mobile flange 11, a second metal control plate 32, usually cut out of metal sheeting, that extends parallel to plate 26, between this plate 26 and mobile flange 11, and is fixed to handle 7 by means of a metal sleeve 33 that surrounds part of control shaft 19, the said second control plate 32 including:

two oblong arc shaped lumina 34 centred on axis X and lying symmetrically in relation to this axis, each of these lumina receiving one of pins 31 of the first control plate 26, and the said pins 31 each being at one end of the corresponding apertures 34 when locking mechanism 5 is in the locked position, so that turning handle 6 and control shaft 19 in angled direction 8 to the operative position of handle 6 does not cause the second control plate 32 to pivot, and two lateral notches 35 that each receive pin 18 of one of the locking units 14, each notch 36 having, on the one hand an edge 35*a* directed radially and outwardly and lies in correspondence with pin 18 of the corresponding locking unit 14 in the locked position of the mobile joint mechanism or when handle 6 is turned, so as to limit the radial and inward sliding of locking unit 14, and on the other hand a cam edge 35*b* directed radially and inwardly and is adapted to engage with the corresponding pin 18 when handle 7 is moved in angle direction 8 to then move the corresponding locking unit 14 radially and inwardly, cam edges 35*b* being so shaped that locking units 14 are then moved further away from the inner toothed gear 12 than when handle 6 is turned, a memory controller 40 in the form of a cut and stamped metal ring that surrounds control plate 26, this memory controller having on its inner edge two notches 41 each of which are a radial guide for the first pin 17 of the corresponding locking unit 14, the memory controller 40 also having two limit stops 42 that protrude radially and inwardly and are respectively adjacent to the two notches 41, limit stops 42 each being situated on the same side of its respective notch 41, the memory controller 40 also having two circular guides 43 directed radially and inwardly and each extending over a little less than 120° from one of notches 41, opposite the corresponding stop 42, and the memory controller 40 also having a stamped radial guide 44 associated with notches 45*a* and 45*b* directed radially, respectively inwardly and outwardly, and a metal memory unit 46 mounted to slide in radial guide 44 of the memory controller and that is furnished with an outer toothed gear 47 designed to engage with an inner toothed gear 12 of the mobile flange when the said memory unit is in an engaged position, the memory unit also having a pin 48 that protrudes towards mobile flange 11 and that can engage with an outer supporting edge 49 of control plate 26 and with an outer supporting edge 36 of control plate 32, to maintain the memory unit 46 in its engaged position respectively when the said control plate 26 is in its neutral position and when the said control plate 32 is in its operative position, and the memory controller unit 46 also having an arc shaped groove 50 centred on axis X, that is permanently engaged in radial play with the part of the memory controller that separates notches 45*a* and 45*b*, and that can engage with an arc shaped rib 51 of the fixed flange 10, this rib also being centred on axis X. This engagement of groove 50 with rib 51 occurs when the seat back is tilted in direction 9 after turning handle 7 to its operative position so as to then maintain memory retaining unit 46 in its engaged position.

The device that has just been described works as follows.

In neutral position, as shown in FIGS. 4 to 7, the locking unit 20 is maintained in its neutral position by spring 24, by pushing the two locking units 14 to their engaged position, and by also maintaining control plate 26 in its neutral position by means of engagement of the pins 25 of the locking device with the upper edge of cut 28 of the said control plate 26.

In this position pins 31 of control plate 26 also maintain control plate 32 in its neutral position.

Moreover, in this position the outer edge 49 of control plate 26 acts on pin 48 of memory retaining unit 46 to maintain this memory retaining unit in its engaged position.

Furthermore, first pins 17 of the locking units are then in notches 41 of memory controller 40.

When the user of seat 1 wishes to adjust the angle of the back he turns handle 6 in angled direction 8, as shown in FIGS. 8 to 11.

Control plate 26 then pivots in direction 8 and the edge of cut 28 presses on the corresponding pin 25 of locking unit 20, which moves this unit to its operating position by allowing the two locking units 14 to slide radially and inwardly to their retracted position.

This movement of the two locking units 14 is controlled positively by the engagement of cam edges 29a and 30a of the control plate 26 with pins 18 of the two locking units, while the limit stop edges 35a of control plate 32 prevent the pins 17 of the locking units from coming out of the corresponding notches 41.

Moreover, in this position the outer support edge 49 of control plate 26 is no longer opposite pin 48 of the memory unit, so this memory unit can slide radially and inwardly to a retracted position as soon as a pivoting torque is applied to the seat back.

In addition, pins 31 of control plate 26 then slide freely in the oblong apertures 34 of control plate 32, so that this control plate 32, sleeve 33 and handle 7 remain stationary in their neutral positions; handle 7, should the need arise, can be activated elastically to its neutral position by a spring that is not shown on the diagrams.

Finally, since handle 6 is then in its operative position, locking mechanism 5a is also moved to its unlocked position by means of the linking rod 5b.

When the user acts on seat back 4 to adjust the angle after turning handle 6, the memory controller remains fixed to fixed flange 10 by means of pins 17, whereas mobile flange 11 turns freely as long as handle 6 is held turned.

Moreover, when the seat user wishes to tilt seat back 4 all the way forward, in tilt direction 9, he turns handle 7 in angled direction 8, as shown in FIGS. 12 to 15.

Control plate 32 then turns in angled direction 8 and shifts control plate 26 by means of pins 31, so that the edge of cut 28 presses on the corresponding pin 25 and moves locking device 20 to its activating position.

Handle 6 is then moved to its operative position with control plate 26, so that locking mechanism 5a is also moved to its unlocked position by means of linking rod 5b.

Moreover, cam edges 35b of control plate 32 then act on pins 18 of locking units 14 to move these units radially and inwardly far enough for pins 17 of the locking units to come out of notches 41 of the memory controller.

Finally, in this position the outer support edge 36 of control plate 32 engages with pin 48 of the memory unit by maintaining this unit locked with the inner toothed gear 12 of the mobile flange.

When the seat back is then tilted in direction 9, as shown in FIGS. 16 to 19, the memory controller 40 turns with mobile flange 11, memory retaining unit 46 staying locked with the inner toothed gear 12 of the mobile flange by engagement of groove 50 of the said unit with the arc shaped rib 51 of the fixed flange, stop 52 of rib 51 defining, with memory retaining unit 46, the furthest forward tilting of the seat back.

At the same time, locking units 14 are maintained in their retracted positions by engagement of circular guides 43 of the memory controllers with pins 17 of the locking units, which also maintains the locking unit 20 in a activating position and handle 6 in operative position, even after handle 7 has been released.

Moreover, since handle 6 is then maintained in operative position, the locking mechanism 5a is also maintained in unlocked position even after handle 7 has been released.

Figure 4:
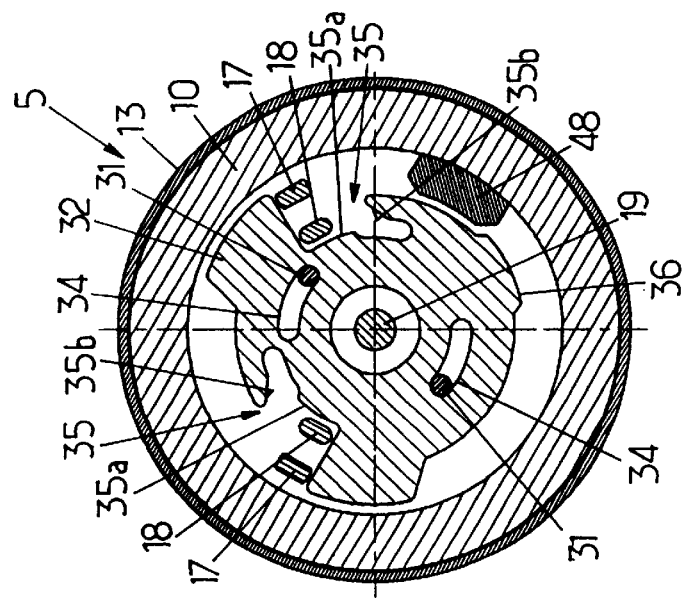

When the user raises the seat back 4 after having tilted it forward, the limit stops 42 of the memory controller stop the upward movement of the back as soon as pins 17 come opposite notches 41, after which these pins again engage with the notches and the mechanism re-locks in the position shown in FIGS. 4 to 6, at the angle previously adjusted by the user.

Finally, in the variant shown in FIGS. 20 to 23, mobile joint mechanism 5 only differs from the mobile joint mechanism described above in that:

pins 31, cuts 27 and 28, notches 29, 30 and 35 and the two oblong apertures 34 lie symmetrically to the layout described above, in relation to a plane P containing the rotation axis X, and the edges 49 and 36 of control plates 26 and 32 are positioned differently from the layout previously described.

Thus handles 6 and 7 can be turned in angle direction 9 as opposed to the angle direction 8 mentioned above, the functioning of the mobile joint otherwise remaining unchanged.

We claim:

1. A mobile joint mechanism designed to equip a vehicle seat that comprises a seat and a back that pivots in relation to the seat, the mechanism comprising:

first and second flanges designed to be fixed to the seat and the back, the flanges being mounted so as to pivot the first flange in relation to the second flange around a rotation axis, the second flange being permanently fixed to a toothed gear that extends over at least an arc of a circle centered on the rotation axis, at least one locking unit equipped with a toothed gear designed to engage with the toothed gear of the second flange, the locking unit being radially movable in relation to the first flange between an engaged position in which the toothed gear of the locking unit engages the toothed gear of the second flange to lock the mechanism and a retracted position in which the toothed gear of the locking unit does not engage the toothed gear of the second flange, the locking unit further having a first pin protruding axially toward the second flange, a locking device to control the sliding of the locking unit, the locking device being activated elastically toward a neutral position in which the locking device places the locking unit in its engaged position, and the locking device being movable to an activating position in which it allows the locking unit to slide to its retracted position, a first controlling device mounted to pivot around the rotation axis between a neutral position and an operative position, the first controlling device being adapted to move the locking device from its neutral position to its activating position when the first controlling device is moved in an angled direction from said neutral position to said operative position, and the first controlling device being activated elastically toward its neutral position, means to move the locking unit to said retracted position when the locking device is in said activating position, and a circular guide mechanically linked to the second flange and that engages with the first pin so as to positively maintain the locking unit in said retracted position when the locking unit is in a predetermined range of angled positions in relation to the circular guide, the circular guide having at least one gap with which the first pin can engage when the locking unit is not in the predetermined plane of angled positions, by allowing the locking unit then to move to said engaged position, wherein:

the circular guide is formed by a rim of a memory controller mounted to pivot in relation to the first and second flanges around the rotation axis, the memory controller comprises a first radial guide that engages with the gap in the circular guide, the first pin being able to slide radially in the first radial guide with practically no play in the direction of the circumference, the memory controller also includes a second radial guide and a memory unit equipped with a toothed gear designed to engage with the toothed gear of the second flange, the memory unit being mounted to slide in the second radial guide between an engaged position in which the memory unit engages with the toothed gear of the second flange to immobilize the memory controller in the relation to the second flange and a retracted position in which the memory unit does not engage with the toothed gear of the second flange and allows relative rotation between the memory controller and the second flange, a second controlling device is mounted to pivot around the rotation axis between a neutral position and an operative position, the second controlling device being activated elastically toward said neutral position and being movable in the angled direction of operation from said neutral position to said operative position, said second controlling device engaging with the locking unit to:

prevent the locking unit from leaving said engaged position up to a point at which the first pin could disengage from the first radial guide of the memory controller as long as the second controlling device is in said neutral position, and allow the locking unit to leave said engaged position to a point at which the first pin can disengage from the first radial guide of the memory controller when the second controlling device is in said operative position, the second controlling device is linked to the first controlling device by an idle movement mechanical link that is adapted:

to allow the first controlling device to move to said operative position, leaving the second controlling device in said neutral position when the first controlling device is activated by a user in the direction of operation, and to drive the first controlling device with the second controlling device when the second controlling device is activated by a user in the direction of operation, the second controlling device engages with the memory unit to maintain the memory unit in said engaged position when the second controlling device is moved to said operative position with no relative rotation between the first and second flanges, and to allow the memory unit to move to said retracted position when the second controlling device is in said neutral position, and, when the second controlling device is placed in said operative position and the second flange has undergone a relative rotation in relation to the first flange in a predetermined angled direction, the memory unit engages with an arc shaped guide centered on the rotation axis and is fixed to the first flange, thereby to maintain the memory retaining unit in said engaged position, so that the memory controller then follows the second flange, the memory unit not engaging with the arc shaped guide when the first pin of the locking unit comes to correspond with the first radial guide.

2. The mobile joint mechanism according to claim 1, in which the second controlling device includes a memory retaining controlling plate perpendicular to the rotation axis and that engages:

on the one hand with the memory unit to maintain the memory unit in said locked position when the second controlling device is in said operative position, and on the other hand with a second pin of the locking unit wherein the second pin protrudes axially towards the second flange to prevent the locking unit from leaving said locked position to the point at which the first pin could disengage from the first radial guide of the memory controller when the second controlling device is in said neutral position, and to move the locking unit to a point allowing the first pin of the locking unit to disengage from the first radial guide of the memory controller when the second controlling device is activated.

3. The mobile joint mechanism according to claim 2, in which the first controlling device includes an adjustment control plate perpendicular to the rotation axis, the adjustment control plate engaging with the second pin of the locking unit to move the locking unit to said retracted position when the first controlling device is moved to said operative position, and to allow the locking unit to leave said locked position to a point at which the first pin can disengage from the first radial guide of the memory controller and slide against the circular guide of said controller when the first controlling device is in said operative position.

4. The mobile joint mechanism according to claim 3, in which the adjustment control plate is linked to the memory retaining control plate by the idle movement mechanical link.

5. The mobile joint mechanism according to claim 3, in which the locking device is mounted to slide in relation to the first flange and is linked mechanically with the adjustment control plate, so that the locking device pushes back the memory retaining control plate and the adjustment control plate to their neutral positions when the locking device comes to said neutral position, and so that the adjustment control plate pushes back the locking device to said activating position when the adjustment control plate is in said operative position.

6. The mobile joint mechanism according to claim 5, in which the locking device includes at least one pin that protrudes axially towards the second flange and that enters at least one cut made in the adjustment control plate, the pin of the locking device engaging with the adjustment control plate to:

move said locking device to said activating position when the first controlling device is moved to said operative position, and maintain the first controlling device in said neutral position when the locking device is maintained elastically in said neutral position.

7. The mobile joint mechanism according to claim 5, in which one of the first and second controlling devices includes a central shaft on which the locking device slides, the locking device also sliding in a guide fixed to the first flange.

8. The mobile joint mechanism according claim 1, including two identical locking units arranged symmetrically in relation to the locking device.

9. The mobile joint mechanism according to claim 8, in which the locking device engages with the two locking units by a wedge effect to push them back to their engaged positions.

10. The mobile joint mechanism according to claim 1, in which the circular guide that engages with the first pin of the locking unit has a limit stop protruding radially at the level of the gap in the circular guide and only on one side of the gap, so that when the first pin of the locking unit leaves the first radial guide the second flange can pivot in the angled tilt direction in relation to the first flange, and then can pivot in an opposite angled direction until the first pin of the locking unit meets the said limit stop of the circular guide, after which the first pin can again engage with the first radial guide.

11. A vehicle seat including a seat and a back mounted to pivot on the seat in combination with a mobile joint mechanism, comprising:

first and second flanges which are fixed to the seat and the back, the flanges being mounted so as to pivot the first flange in relation to the second flange around a rotation axis, the second flange being permanently fixed to a toothed gear that extends over at least an arc of a circle centered on the rotation axis, at least one locking unit equipped with a toothed gear designed to engage with the toothed gear of the second flange, the locking unit being radially movable in relation to the first flange between an engaged position in which the toothed gear of the locking unit engages the toothed gear of the second flange to lock the mechanism and a retracted position in which the toothed gear of the locking unit does not engage the toothed gear of the second flange, the locking unit further having a first pin protruding axially towards the second flange, a locking device to control the sliding of the locking unit, the locking device being activated elastically toward a neutral position in which the locking device places the locking unit in its engaged position, and the locking device being movable to an activating position in which it allows the locking unit to slide to its retracted position, a first controlling device mounted to pivot around the rotation axis between a neutral position and an operative position, the first controlling device being adapted to move the locking device from its neutral position to its activating position when the first controlling device is moved in an angled direction from said neutral position to said operative position, and the first controlling device being activated elastically toward its neutral position, means to move the locking unit to said retracted position when the locking device is in said activating position, and a circular guide mechanically linked to the second flange and that engages with the first pin so as to positively maintain the locking unit in said retracted position when the locking unit is in a predetermined range of angled positions in relation to the circular guide, the circular guide having at least one gap with which the first pin can engage when the locking unit is not in the predetermined plane of angled positions, by allowing the locking unit then to move to said engaged position, wherein:

the circular guide is formed by a rim of a memory controller mounted to pivot in relation to the first and second flanges around the rotation axis, the memory controller comprises a first radial guide that engages with the gap in the circular guide, the first pin being able to slide radially in the first radial guide with practically no play in the direction of the circumference, the memory controller also includes a second radial guide and a memory unit equipped with a toothed gear designed to engage with the toothed gear of the second flange, the memory unit being mounted to slide in the second radial guide between an engaged position in which the memory unit engages with the toothed gear of the second flange to immobilize the memory controller in the relation to the second flange and a retracted position in which the memory unit does not engage with the toothed gear of the second flange and allows relative rotation between the memory controller and the second flange, a second controlling device is mounted to pivot around the rotation axis between a neutral position and an operative position, the second controlling device being activated elastically toward said neutral position and being movable in the angled direction of operation from said neutral position to said operative position, said second controlling device engaging with the locking unit to:

prevent the locking unit from leaving said engaged position up to a point at which the first pin could disengage from the first radial guide of the memory controller as long as the second controlling device is in said neutral position, and allow the locking unit to leave said engaged position to a point at which the first pin can disengage from the first radial guide of the memory controller when the second controlling device is in said operative position, the second controlling device is linked to the first controlling device by an idle movement mechanical link that is adapted:

to allow the first controlling device to move to said operative position, leaving the second controlling device in said neutral position when the first controlling device is activated by a user in the direction of operation, and to drive the first controlling device with the second controlling device when the second controlling device is activated by a user in the direction of operation, the second controlling device engages with the memory unit to maintain the memory unit in said engaged position when the second controlling device is moved to said operative position with no relative rotation between the first and second flanges, and to allow the memory unit to move to said retracted position when the second controlling device is in said neutral position, and, when the second controlling device is placed in said operative position and the second flange has undergone a relative rotation in relation to the first flange in a predetermined angled direction, the memory unit engages with an arc shaped guide centered on the rotation axis and is fixed to the first flange, thereby to maintain the memory retaining unit in said engaged position, so that the memory controller then follows the second flange, the memory unit not engaging with the arc shaped guide when the first pin of the locking unit comes to correspond with the first radial guide.

12. The seat according to claim 11, including two sides, wherein one of the sides is equipped with said mobile joint mechanism, and the other side is equipped with a locking mechanism that can be moved between a locking position in which the locking mechanism prevents the back from pivoting in relation to the seat and an unlocked position in which the locking mechanism allows the back to pivot in relation to the seat, the locking mechanism being controlled by a transverse link that is linked to the first controlling device corresponding to the locking position of the locking mechanism, and the active position of the first controlling device of the mobile joint mechanism, the neutral position of the first controlling device corresponding to the unlocked position of the locking mechanism.

* * * * *